United States Patent [19]
Spaggiari

[11] Patent Number: 5,645,101
[45] Date of Patent: Jul. 8, 1997

[54] DEVICE FOR INFLATING PNEUMATIC TIRES

[75] Inventor: Rino Spaggiari, Corregio, Italy

[73] Assignee: G.S. S.r.l., Correggio, Italy

[21] Appl. No.: 536,387

[22] Filed: Sep. 29, 1995

[30] Foreign Application Priority Data

Jul. 26, 1995 [IT] Italy ............................. MO95A0111

[51] Int. Cl.⁶ ........................................ F16K 31/385
[52] U.S. Cl. ................... 137/225; 137/224.5; 137/489
[58] Field of Search .......................... 137/224, 224.5, 137/225, 489, 492.5

[56] References Cited

U.S. PATENT DOCUMENTS

| | | | |
|---|---|---|---|
| 1,228,104 | 5/1917 | Fulton | 137/489 |
| 1,805,397 | 5/1931 | Harris | 137/225 X |
| 1,814,206 | 7/1931 | Donkin et al. | 137/489 X |
| 2,307,314 | 1/1943 | Willson | 137/224.5 |
| 2,731,029 | 1/1956 | Rittenhouse | 137/225 |
| 3,076,472 | 2/1963 | Newell | 137/225 |
| 3,592,223 | 7/1971 | Reese | 137/489 |
| 4,872,492 | 10/1989 | McAnally et al. | 137/224 X |

*Primary Examiner*—John Rivell
*Attorney, Agent, or Firm*—Browdy and Neimark

[57] ABSTRACT

The device for inflating pneumatic tires comprises an inlet of pressurized air and an outlet for sending the air into a pneumatic tire. A first circuit of the device is divided into an initial tract and a final tract, which connects the inlet with the outlet, passing through a first on-off valve provided with a membrane. A second circuit of the device connects the inlet with a first chamber of the first on-off valve. The first chamber is also connected to a pressure regulator connected at outlet to a second on-off valve, which intercepts the air flow. A third circuit connects the outlet to a first chamber of the second on-off valve.

6 Claims, 2 Drawing Sheets

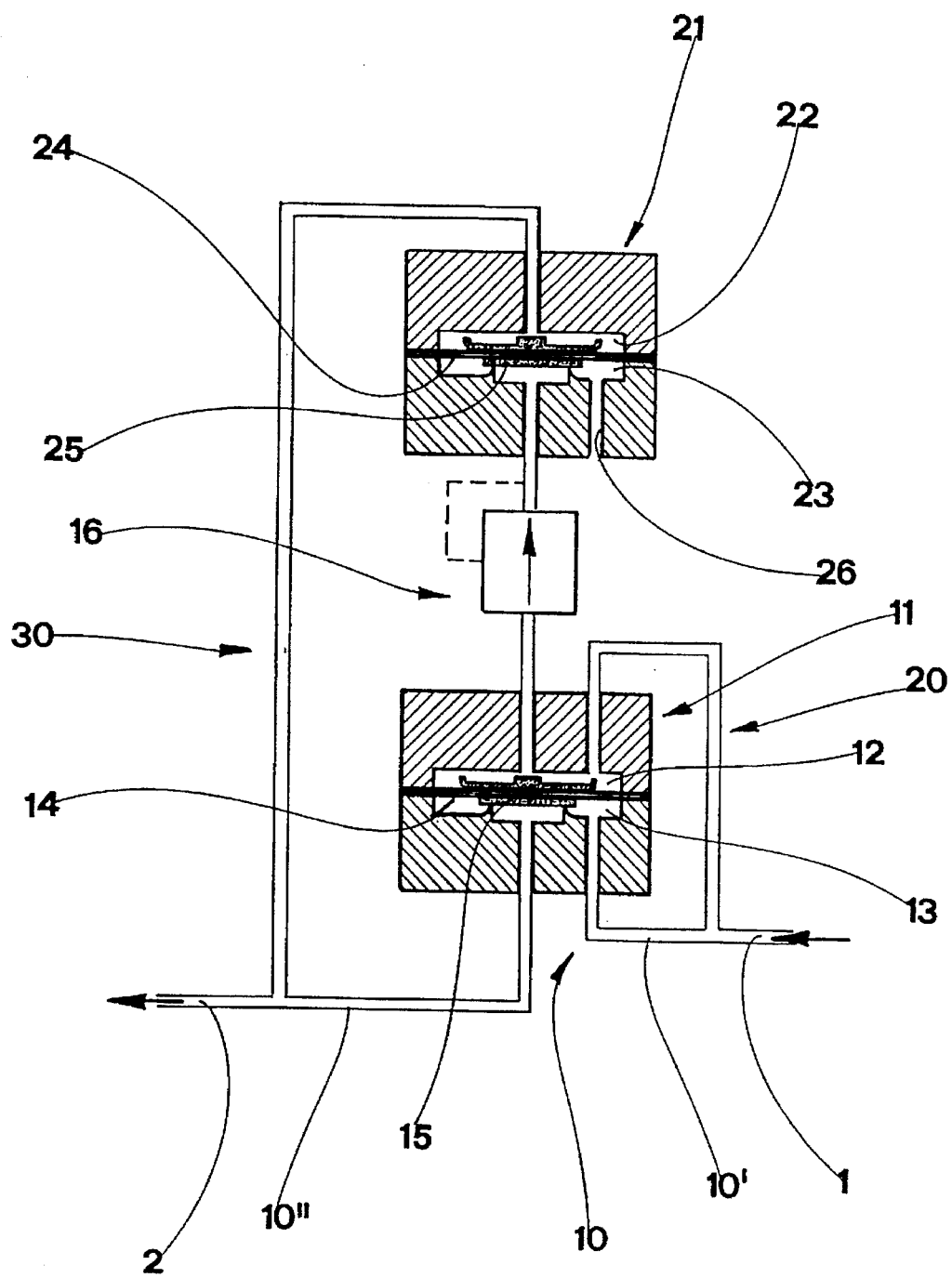

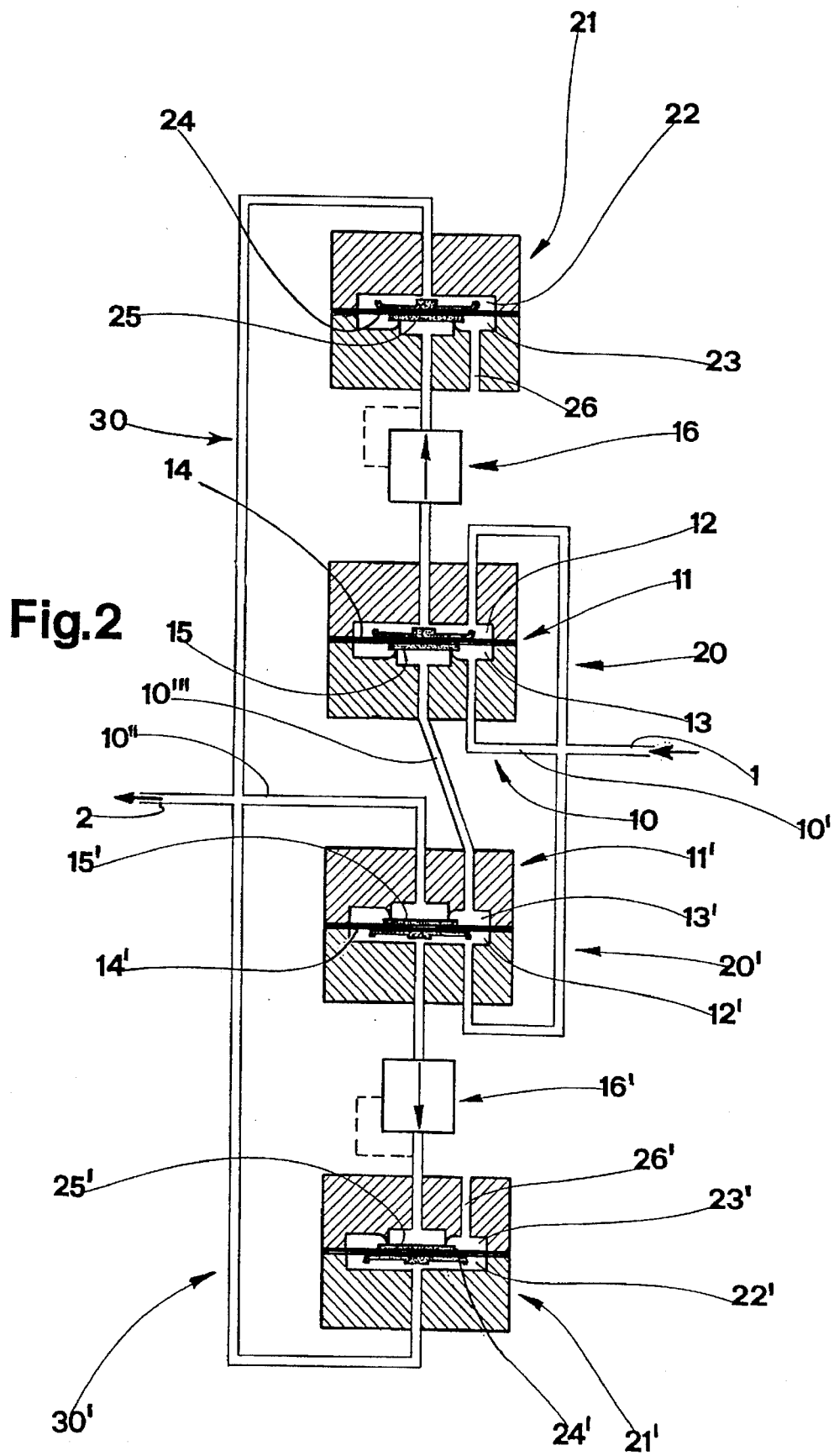

DEVICE FOR INFLATING PNEUMATIC TIRES

BACKGROUND OF THE INVENTION

The invention relates to a device for inflating pneumatic tires.

Devices for the above purpose, well-known in the prior art, are fed by a source of pressurized air, which air is injected into the tire up until the pressure therein reaches a predetermined level. These prior-art devices, however, exhibit some drawbacks. Some are constructionally complex and expensive, while others are functionally limited; still others present considerable maintenance problems.

The present invention, as it is characterized in the claims that follow, obviates the above mentioned drawbacks and lacks in the prior art by providing a device for inflating pneumatic tires which is constructionally simple and which is realized exclusively by means of pneumatically activated components operating in circuits.

BRIEF DESCRIPTION OF THE DRAWINGS

Further characteristics and advantages of the present invention will better emerge from the detailed description that follows, of an embodiment of the invention, illustrated in the form of a non-limiting example in the accompanying drawings, in which:

FIG. 1 relates to a first preferred embodiment of the invention;

FIG. 2 relates to a second embodiment of the invention.

DESCRIPTION OF THE PREFERRED EMBODIMENTS

With reference to the figures of the drawings, 1 denotes a pressurized air inlet, with air feeding in from a pressurized air source not illustrated in the drawings. 2 denotes an outlet for air transiting towards a tire about to be inflated.

In the first embodiment, illustrated in FIG. 1, the inlet 1 is connected to the outlet 2 by a first circuit 10 subdivided into two tracts, an initial tract 10' and a final tract 10", between which a first on-off valve 11 comprising a pressure-sensitive membrane 14 is located. A second circuit 20 also stems from the inlet 1, which second circuit 20 connects the inlet 1 to a first chamber 12 of said first on-off valve 11. The first chamber 12 of the first on-off valve 11 is separated from a second chamber 13 thereof placed in direct communication with the inlet 1 by means of the membrane 14, which is associated to an obturator 15 which can intercept, depnding on a position assumed by the membrane 14, the exiting flow from the second chamber 13. The first chamber 12 is connected to a pressure regulator 16, which at outlet is connected to a second on-off valve 21 identical to said first on-off valve 11.

The pressure regulator 16 provides at outlet a constant and predetermined air pressure which is independent of the higher pressure upstream at the inlet of the pressure regulator 16. The second circuit 20 connecting the inlet 1 with the first chamber 12 of the first on-off valve 11 is subject to a drop in air pressure of a preestablished degree—which pressure drop is of greater entity than a pressure drop occurring in the connection between the inlet 1 and the second chamber 13 of the first on-off valve 11.

An outlet of the pressure regulator 16 is in direct communication with the second chamber 23 of the second on-off valve 21. An obturator, housed inside the second on-off valve 21, when closed completely cuts off output flow from the pressure regulator 16. The second chamber 23 connected to the outside environment by means of a conduit 26.

A third circuit 30 connects the outlet 2 with the first chamber 22 of the second on-off valve 21. The first chamber 22 is separated from the second chamber 23 by means of a membrane 24 to which the obturator 25 is associated. The obturator 25 intercepts the inlet flow into the second chamber 23 from the outlet of the pressure regulator 16. The second on-off valve 21 is of a size and proportion such as to close when the pressure in the first chamber 22 thereof is equal to a determined fraction of the pressure at the outlet of the pressure regulator 16.

The first on-off valve 11 and second on-off valve 21 are sensitive to pressure. In particular, said valves 11 and 21 are normally open but close when the pressures in the first chamber 12 and the first chamber 22 respectively rise above (according to a predetermined rapport) the pressures in chambers 13 and 23 respectively.

When the device is activated, it functions according to repetitions of a series of cycles which occur as follows.

Admittance of pressurized air into the inlet 1 initially leaves the first on-off valve 11 open so that the air can flow through the first circuit 10 up until it reaches the outlet 2, and then on into the tire. The second circuit 20 is made in such a way that the drop in pressure throughout is greater than that existing in the connection between the inlet 1 and the second chamber 13 of the first on-off valve 11. In this situation the membrane 14 keeps the obturator 15 displaced from its seating and thus permits free flow of the air through the first on-off valve 11. At the same time, in the third circuit 30, the pressure at inlet of the first chamber 22 of the second on-off valve 21 will be lower than the pressure existing at the outlet 2, so that the second on-off valve 21 will stay open. Also at the same time, independently of the pressure level upstream of the pressure regulator 16, downstream there will be a constant pressure which is prefixed by the setting of the pressure regulator 16 itself.

As the air enters the tire (not shown in the accompanying figures of the drawings), the dynamic balances inside the device change: the pressure increases both internally of the tire and therefore at the outlet 2, as well as along the third circuit 30. This growth in pressure occurs while the pressure in the first chamber 22 of the second on-off valve 21 is approaching a pressure which will finally balance the outlet pressure from the pressure regulator 16, equal to that in the second chamber 23. Once this pressure is balanced, the obturator 25 closes the outlet of the pressure regulator 16, stopping the flow. Closure of the second on-off valve 21 automatically produces a static pressure internally of the second circuit 20, which pressure equalizes with the pressure at the inlet 1. At this point the first on-off valve 11 also closes, its obturator 15 intercepting the flow of air through the first circuit 10, and air no longer exits from the outlet 2; indeed, a situation of pressure equilibrium becomes rapidly established and equalizes with the pressure in the final tract 10" of conduit situated between the first on-off valve 11 and the outlet 2 and in the tract of the third circuit 30 which connects the outlet 2 with the second on-off valve 21. Once this pressure level has been established, the second on-off valve 21 is again placed in a situation of imbalance, and opens, leading to a sudden drop in pressure in the first chamber 12 of the first on-off valve 11 and consequently causing the obturator 15 to rise. The first on-off valve 11 is thus opened and a new cycle begins. The cycles repeat time and time again up until an equilibrium is reached, which equilibrium is determined by the outlet pressure of the pressure regulator 16.

FIG. 2 shows a second preferred embodiment of the invention, which is in effect a kind of doubling of the device illustrated in FIG. 1. Indeed, two of the devices of FIG. 1 are provided, coupled in series for safety reasons. In detail, the device comprises a first circuit 10 connecting the inlet 1 with the outlet 2, which first circuit 10 comprises an initial tract 10' connecting the inlet 1 with the first on-off valve 11, an intermediate tract 10'" connecting the first on-off valve 11 with a third pressure-sensitive on-off valve 11' identical to the first on-off valve 11, and a final tract 10", connecting the third on-off valve 11' with the outlet 2.

As in the first embodiment, the inlet 1 is connected to the first on-off valve 11 through a circuit 20; also present are a pressure regulator 16 and a second on-off valve 21 which is connected to the outlet 2 by means of a circuit 30. A fourth circuit 20' originates in the inlet 1 and connects the latter with a first chamber 12' of the third on-off valve 11'. The first chamber 12' is separated from a second chamber 13' by means of a membrane 14' to which an obturator is associated; the task of the membrane 14' being to intercept the flow exiting from the second chamber 13'. The second chamber 13' is placed in communication with the second chamber 13 of the first on-off valve 11 by means of the intermediate tract 10'" of circuit. The first chamber 12' of said third on-off valve 11' is also connected to a pressure regulator 16'; the outlet of said pressure regulator 16' is in turn connected to a fourth on-off valve 21' which intercepts air flow. A circuit 30' connects the outlet 2 with a first chamber 22' of the fourth on-off valve 21'. The first chamber 22' is separated from a second chamber 23' of the fourth on-off valve 21' by means of a membrane 24' to which an obturator 25' is associated, which obturator 25' intercepts the inlet flow into the second chamber 23' coming from the outlet of the pressure regulator 16'. The second chamber 23' is directly connected with the outside environment by means of a conduit 26'.

The pressure regulator 16' provides a constant pressure in outlet, independently of the higher pressure level present at inlet of the pressure regulator 16' itself.

The functioning of the part comprising third and fourth valves 11' and 21', pressure regulator 16' and relative connection circuits are identical to those of the first embodiment of the invention as illustrated in FIG. 1, which comprises only first and second valves 11 and 21, pressure regulator 16 and the corresponding connection circuits.

By providing a "doubled-up" device, the intention is to offer a guarantee of safety should, for example, one of the membranes break.

What is claimed:

1. A device for inflating pneumatic tires, comprising:

an inlet of pressurized air and an outlet for sending said air to a pneumatic tire to be inflated;

a first circuit comprising a initial tract of pipe connecting said inlet to a pressure-sensitive first on-off valve, and a final tract of pipe connecting said first on-off valve to said outlet;

a second circuit originating at said inlet and connecting said inlet to a first chamber of said first on-off valve; said first chamber being separated from a second chamber of said first on-off valve, which second chamber is in direct communication with the inlet, by means of a membrane; said membrane being associated to an obturator for intercepting an air flow in outlet coming from said second chamber; said first chamber also being connected to a pressure regulator connected at an outlet thereof to a second on-off valve for intercepting air flow;

a third circuit connecting said outlet to a first chamber of said second on-off valve; said first chamber of said second on-off valve being separated from a second chamber of said second on-off valve by means of a membrane; said membrane being associated to an obturator for intercepting an air flow in inlet to said second chamber of said second on-off valve, said air flow in inlet coming from the outlet of said pressure regulator.

2. The device of claim 1, wherein said pressure regulator provides a constant air pressure in outlet, which constant air pressure is independent of a higher pressure value present at an inlet of said pressure regulator.

3. The device of claim 1, wherein the second circuit connecting said inlet to said first chamber of said first on-off valve is subject to a drop in air pressure due to air flow, which drop in air pressure is of a predetermined degree and is greater than a drop in pressure existing in the connection between said inlet and the second chamber of said first valve.

4. The device of claim 1, wherein the first circuit is subdivided into said initial tract, an intermediate tract and said final tract:

said initial tract connecting said inlet to said first on-off valve;

said intermediate tract connecting said first on-off valve to a third on-off valve identical to said first on-off valve;

said final tract connecting said third on-off valve with said outlet;

a fourth circuit being provided, originating from said inlet and connecting said inlet to a first chamber of said third on-off valve; said first chamber of said third on-off valve being separated from a second chamber thereof by means of a membrane, which membrane is associated to an obturator for intercepting an air flow in outlet from said second chamber of said third on-off valve; said second chamber of said third on-off valve being in direct communication with said second chamber of said first on-off valve by means of said third tract of circuit; said first chamber of said third on-off valve being connected to a second pressure regulator in turn connected at outlet thereof to a fourth on-off valve for intercepting air flow in outlet from said second pressure regulator; a fifth circuit also being provided for connecting said second pressure regulator at outlet to a first chamber of said fourth on-off valve; said first chamber of said fourth on-off valve being separated from a second chamber thereof by means of a membrane to which an obturator is associated for intercepting an air flow in inlet to said second chamber of said fourth on-off valve from the outlet of said second pressure regulator.

5. The device of claim 4, wherein the second pressure regulator provides in outlet a constant air pressure which is independent of a higher air pressure level present at an inlet of said second pressure regulator.

6. The device of claim 5, wherein a drop in air pressure occurs in said fourth circuit connecting said inlet to said first chamber of said third on-off valve, which drop in air pressure is of a higher degree than a drop in air pressure between said inlet and said second chamber of said third on-off valve.

\* \* \* \* \*